UNITED STATES PATENT OFFICE

2,533,004

FIBRIN CLOTS AND METHODS FOR PREPARING THE SAME

John D. Ferry, Woods Hole, Mass., and Peter R. Morrison, Washington, D. C., assignors to United States of America as represented by the Secretary of War No Drawing. Application October 27, 1943, Serial No. 507,904

5 Claims. (Cl. 260—112)

This invention relates to fibrin clots and to methods for preparing the same.

As is well known, fibrin is derived from fibrinogen which is present in solution in the plasma of blood. Blood fibrin is usually prepared either in stringy masses by whipping freshly drawn blood or in the form of weak clots by inhibiting the normal clotting process with citrate or oxalate, removing the red corpuscles by centrifuging and adding to the remaining plasma an excess of calcium salt. However, the fibrin clots obtained by either of these processes do not lend themselves readily to any practical application, nor can their properties readily be varied.

One object of this invention is therefore to provide a method for producing fibrin clots susceptible of practical application in various fields now unavailable to clots of this character prepared in accordance with prevailing methods.

Another object of this invention is to provide a method for effecting, under controlled physical-chemical conditions, various types of fibrin clots, the respective types possessing different properties relative to clotting time, friability, adherence to surfaces, tensile strength and the like.

Another object of the invention is to provide a fibrin clot from which may be prepared a wide variety of fibrin products not heretofore known to the art and which are readily adapted to numerous practical uses such as burn and wound coverings, nerve, intestinal and artery sutures, artificial catgut, preventing adhesions in brain surgery, and for protecting vulnerable areas from irritants.

By the present invention, instead of clotting fibrin from whole blood or whole plasma, the plasma is first fractionated to obtain a more concentrated fibrinogen solution or one in which the fibrinogen is not associated with as large a relative amount of other proteins as in whole blood. This may be accomplished, for instance, by employing fractionated purified materials prepared by the methods described in the copending patent applications of Edwin J. Cohn, Serial Nos. 371,401; 430,075; and 460,121, filed December 23, 1940; February 9, 1942; and September 29, 1942, respectively, Serial No. 371,401 has been forfeited, Serial No. 430,075 is now Patent No. 2,390,074, and Serial No. 460,121 is abandoned.

The desired fibrinogen solution having been obtained, the fibrinogen is clotted with a fibrin ferment such as purified thrombin, which may be prepared by procedures known to those skilled in the art.

The physical-chemical conditions under which the fibrin clot is formed are carefully controlled, particularly the concentration of fibrinogen in the solution, the concentration with respect to thrombin, the pH, the ionic strength, and the temperature of the solution in which the clot is formed.

In this connection, it has been found that by varying these conditions the properties of the final clot can be altered with respect to clotting time, friability or ease of crushing, amount of spontaneous syneresis, tensile strength, elongation at break, modulus of elasticity, permanent set, etc.

It has also been found that the properties of the clot can be changed markedly by the addition of certain other substances such as polyhydric alcohols and starches.

The properties of our novel fibrin clots may be graded between two extremes. One extreme type, which we will refer to as type A, is transparent, gelatinous, friable, and easily crushed, with relatively low tensile strength and low permanent set. This type of clot does not synerize and adheres well to surfaces on which it is formed.

The other extreme type, which we shall refer to as type B, is opaque, plastic, non-friable, impossible to crush, with relatively high tensile strength and considerable permanent set. This type of clot synerizes enormously, contracting to 5% or less of its original volume and forming a compacted structure. It does not adhere well to surfaces on which it is formed.

Intermediate types can be prepared.

The conditions which favor type A clots are high pH, high ionic strength, high fibrinogen concentration, high thrombin concentration, and high temperature (e. g. 37° C.). The converse conditions favor type B clots.

Addition of polyhydric alcohols, for example glycols or glycerol, to the solution before clotting changes the properties toward those of a type A clot (except that the clotting time is increased). Addition of soluble starch changes the properties toward those of a type B clot.

The clotting time is generally decreased by changing conditions in the direction of formation of a type A clot, except in the case of addition of a polyhydric alcohol, which increases the clotting time.

As an example of the preparation of fibrinogen suitable for use in the formation of these novel clots, the following may be given:

The corpuscles are first removed from the blood by centrifugation, clotting of the fibrinogen being prevented by the addition of citrates or like agents.

The plasma remaining after the separation of the corpuscles may then be treated for the precipitation therefrom of fibrinogen by cooling the same to 0° C. to −3° C. and adding thereto an organic precipitant, for example an alcohol such as ethanol. Ethanol may be added in amount sufficient to constitute 8% to 10% by volume of the plasma. The hydrogen ion concentration and the ionic strength of the plasma are also preferably adjusted. The pH of the solution may be controlled by the addition of acids or alkalis and the ionic strength by the addition of a salt, for example sodium chloride, ammonium sulfate, sodium sulfate, sodium, ammonium or potassium phosphate, acetate, carbonate, citrate or the like. Phosphates, carbonates, or citrates are particularly suitable salts because they have a buffer action and thus control both the ionic strength and the hydrogen ion concentration. For the precipitation of fibrinogen the pH may initially be adjusted in the neighborhood of 6.0 to 7.8. An ionic strength of 0.05 is adequate for effecting electrical discharge and flocculation; higher ionic strengths (e. g., 0.15 or more) are sometimes desirable for buffering.

The protein thus precipitated comprises 45% to 65% fibrinogen. It may be dissolved in a solution of sodium citrate at a pH of 5.9 to 6.7 and then frozen and dried from the frozen state, producing a stable powder which can be stored for long periods and afterwards easily redissolved in order to make fibrin clots. By filtering the solution through suitable filters before freezing, it can be sterilized, and a sterile powder prepared.

The protein precipitated as described above may, if desired, be purified by dissolving it in a solution of sodium citrate or phosphate buffer at a pH in the neighborhood of 6.3 and reprecipitating at −3° C. by adding an equal volume of a 12% aqueous solution of ethanol.

At the time of dissolving the protein it is advantageous to add to the solution a sugar, such as glucose or maltose, in amount up to 8% by weight of the solution. This addition tends to prevent spontaneous clotting of the fibrinogen during the subsequent processing.

The protein thus reprecipitated is composed of 80% to 90% of fibrinogen. It may be dissolved in a solution of sodium citrate buffer of ionic strength 0.3 and pH in the neighborhood of 6.3 and then frozen and dried from the frozen state, producing a stable powder which can be stored long periods and afterwards easily redissolved preparatory to making fibrin clots.

Fibrinogen solutions suitable for use in the method of this invention may be prepared by dissolving in water the fibrinogen powder or the reprecipitated fibrinogen powder.

Suitable solutions, may, of course, be prepared by other methods, for example by dissolving the moist fibrinogen precipitate without previously drying it.

In human plasma the fibrinogen constitutes about 0.25% by weight of the solution and about 4% of the total protein content. In bovine plasma the fibrinogen constitutes about 0.65% by weight of the solution and about 9% of the total protein content. As distinguished from this, there may be employed a plasma fraction in which the fibrinogen comprises 45% to 65% of the total protein present or a re-purified fraction in which the fibrinogen comprises 80% to 90% of the total protein. The fibrinogen may constitute up to 3% of the total solution. These figures are given merely by way of example, however, since the advantages of the invention will be obtained in some degree with much smaller fibrinogen concentrations. For some purposes, fibrinogen concentrations of 0.5% or 0.05% of the solution are suitable.

From such solutions, however obtained, is prepared the novel fibrin clots of this invention. As one example of a procedure suitable for producing the general type of clot previously referred to as type A, the following is given:

An aqueous fibrinogen solution containing 0.5% to 2% fibrinogen may be used, at room temperature, approximately 25° C. The pH is adjusted to 6.8 to 7.6 by means of an alkaline medium such as disodium phosphate. The ionic strength is adjusted to the neighborhood of 0.02 to 0.05 by addition of a salt such as sodium chloride. Purified thrombin is added in amount sufficient to make a final concentration of 0.1 to 1.0 unit per cubic centimeter, and the solution is quickly transferred to the mold in which the clot is to be formed, or, in clinical applications, to the area which is to be treated. Clotting takes place in from a few seconds to fifteen minutes, depending on the pH, fibrinogen concentration, thrombin concentration, ionic strength, and temperature.

The thrombin unit referred to is defined as that amount of thrombin which will clot 1 cc. of 1% fibrinogen solution at a pH of 7 and an ionic strength of 0.3, at 25° C. in fifteen seconds.

Another example of a suitable procedure for the preparation of a type A clot, in which a polyhydric alcohol is used, is the following:

A fibrinogen solution containing 1% to 2% fibrinogen may be used, at room temperature. The pH is adjusted to any value desired between 6.0 and 7.6. The ionic strength is adjusted to the neighborhood of 0.2 to 0.5. Glycerol is added in amount sufficient to constitute 20% of the total volume. Purified thrombin is added in amount sufficient to make a final concentration of 0.1 to 1.0 unit per cubic centimeter, and the solution is quickly transferred to the mold in which the clot is to be formed, or, in clinical applications, to the area which is to be treated. Clotting takes place after several minutes, the time depending on the pH, fibrinogen concentration, thrombin concentration, ionic strength, and temperature.

As an example of the preparation of the general type of clot previously designated as type B, the following is given:

An aqueous fibrinogen solution containing 0.5% to 2% fibrinogen may be used, at room temperature. The pH is adjusted to 6.0 to 6.5, if necessary. The ionic strength is adjusted to the neighborhood of 0.2 to 0.5. Purified thrombin in amount sufficient to make a final concentration of 0.1 to 1.0 unit per cubic centimeter is added, and the solution is quickly transferred to the mold in which the clot is to be formed, or, in clinical applications, to the area which is to be treated. Clotting takes place in from a few seconds to fifteen minutes, depending on the pH, fibrinogen concentration, thrombin concentration, ionic strength, and temperature.

The foregoing examples also serve to illustrate the influence of hydrogen ion concentration upon the properties of the fibrin clot. As previously indicated, comparable results may be obtained by varying other physical-chemical conditions, such as the ionic strength, the fibrinogen concentration, the thrombin concentration, or the temperatures, or by adding modifying substances such as glycerol or other polyhydric alcohols, starch, etc.

The clots of this invention can be formed into a great variety of shapes and sizes, including sheets, filaments, tubes, blocks, etc. They can be prefabricated and processed or they can be formed in situ inside of or on the surface of wounds. The fibrin concentration may be as high as 3%. After syneresis of the type B clots it may, of course, be much higher. Other ingredients may be added, if desired, without excessively diluting the proportion of fibrin and without interference by the other plasma proteins with their action.

The clots can be formed with embedded materials such as fibres, felts, woven fabrics or elastic knitted fabrics, which alter the mechanical properties of the clots and improve their resistance to pressure. The fibres may project from the surface of the clot, forming a nap which adheres well to a second clot, as for example on the surface of a wound.

The clots can be formed under sterile conditions. They may also be formed with embedded materials such as sulfa drugs and penicillin, or from suspensions of such materials, which inhibit bacterial growth in healing wounds. Antilysins, for example quinones such as p-benzoquinone or heavy metal compounds such as cuprous oxide, may be added to the clot.

In conclusion, the novel clots produced by this invention give only a very slight tissue reaction; they persist in the body for considerable periods, which periods are controllable by variation in the nature of the clot, but they are eventually absorbed in the human or animal organism; their adhesiveness, elasticity, toughness, extensibility, and other properties may be controlled, as previously indicated. Hence the fibrin clots obtained by the above stated method are suited for a wide variety of uses for which fibrin clots heretofore known have not been usable.

Having thus described our invention, what we claim as new and wish to secure by Letters Patent is:

1. A method for forming new compositions of matter which comprises the following steps, preparing a blood protein solution containing fibrinogen in excess of 10% of the total protein, said solution containing at least 0.5% fibrinogen, adding to the solution a substance selected from the group consisting of polyhydric alcohols and starches, and converting the fibrinogen into fibrin, by adding thrombin to said solution to form a fibrin clot.

2. A fibrin-thrombin clot produced by addition of thrombin to a blood protein solution containing fibrinogen in excess of 10% of the total protein and containing at least 0.5% fibrinogen, the said blood protein solution also containing a substance selected from the group consisting of polyhydric alcohols and starches.

3. A fibrin-thrombin clot produced by the addition of thrombin to a blood protein solution containing fibrinogen in excess of 10% of the total protein and containing at least 0.5% fibrinogen, the said solution having a pH value between 6.0 and 7.6 and an ionic strength of from approximately 0.2 to approximately 0.5.

4. A method for forming fibrin clots, which comprises providing an aqueous protein solution containing fibrinogen, in which solution the fibrinogen is in excess of 10% of the total protein and at least 0.5% fibrinogen, and converting the fibrinogen into fibrin by adding thrombin to the said solution to form a fibrin clot.

5. A method for forming fibrin clots, which comprises providing an aqueous protein solution containing fibrinogen, in which solution the fibrinogen is in excess of 10% of the total protein, adjusting the pH of the resulting solution to a value between 6.0 and 7.6 and the ionic strength to approximately 0.2 to 0.5, and converting the fibrinogen into fibrin by adding to the said solution thrombin in amount sufficient to give a final concentration of 0.1 to 1.0 thrombin unit per cubic centimeter of solution.

JOHN D. FERRY.
PETER R. MORRISON.

REFERENCES CITED

The following references are of record in the file of this patent:

UNITED STATES PATENTS

| Number | Name | Date |
|---|---|---|
| 1,593,814 | Vogel | July 27, 1926 |
| 2,241,868 | Reimann | May 13, 1941 |

OTHER REFERENCES

Merck's Index, Fourth edition, 1930, page 234, Merck & Co., Inc., Rahway, N. J.

Jour. Biological Chemistry 123, 1938, pages 751–754.

Chapter XXVIII, "The Coagulation of the Blood," in McLeod's (8th edition) Physiology in Modern Medicine, edited by Philip Bard; published 1938 by the C. V. Mosby Co., St. Louis, Missouri.

The Lancet, Aug. 3, 1940, vol. 239, 1940, pages 126–128, by J. Z. Young et al., "Fibrin Suture of Peripheral Nerves."

Journal of the Am. Chem. Society 62, Dec. 1940, pages 3396–3400, 128/Blood Coag. by E. J. Cohn et al.

Cohn-Chemical Reviews, vol. 28 (1941), pp. 395 to 417.

The Hemorrhagic Diseases, Armand J. Quick, copyright 1942, pub. by Charles C. Thomas, Springfield, Ill.

Journal-Lancet, Dec. 1942, vol. 62, No. 12, pages 455–456.

Am. Journal of Surgery LIX No. 1, Jan. 1943, pages 104–105, Moorehead et al., "Human Red Cell Concentrate for Surgical Dressings."

Tropical Diseases Bulletin, June 1943—Blood Dressings.

Handbook of Plastics, Simonds-Ellis, 1943, page 298, D. Van Nostrand Co., Inc. (July 1943).

Science Newsletter, Feb. 19, 1944, page 120.

Modern Drug Encyclopedia, Gutman, 2nd edition.

U. S. Dispensatory, 23rd ed., page 1367.